(12) United States Patent
Dutta et al.

(10) Patent No.: US 8,843,877 B2
(45) Date of Patent: Sep. 23, 2014

(54) INTEGRATED SOA DEPLOYMENT AND MANAGEMENT SYSTEM AND METHOD FOR SOFTWARE SERVICES

(75) Inventors: Satadip Dutta, Cupertino, CA (US); Tim Hall, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1631 days.

(21) Appl. No.: 12/272,485

(22) Filed: Nov. 17, 2008

(65) Prior Publication Data

US 2010/0125618 A1     May 20, 2010

(51) Int. Cl.
*G06F 9/44*     (2006.01)
*G06F 11/36*     (2006.01)

(52) U.S. Cl.
CPC ................ G06F 8/10 (2013.01); G06F 11/368 (2013.01); G06F 11/3692 (2013.01)
USPC ........................................................ 717/101

(58) Field of Classification Search
USPC ........................................................ 717/101
See application file for complete search history.

(56) References Cited

U.S. PATENT DOCUMENTS

| | | | |
|---|---|---|---|
| 7,509,627 B1 | 3/2009 | Ayachitula | |
| 7,895,565 B1* | 2/2011 | Hudgons et al. | 717/106 |
| 2005/0028084 A1 | 2/2005 | Dziejma | |
| 2005/0222931 A1* | 10/2005 | Mamou et al. | 705/35 |
| 2006/0010195 A1 | 1/2006 | Mamou | |
| 2006/0235733 A1* | 10/2006 | Marks | 705/7 |
| 2008/0034347 A1 | 2/2008 | V | |
| 2008/0066048 A1* | 3/2008 | Hafermann et al. | 717/100 |
| 2009/0064087 A1 | 3/2009 | Isom | |
| 2009/0177957 A1 | 7/2009 | Bouillet | |
| 2009/0281996 A1* | 11/2009 | Liu et al. | 707/3 |
| 2010/0095266 A1 | 4/2010 | Novak | |
| 2010/0125618 A1 | 5/2010 | Dutta | |

OTHER PUBLICATIONS

Graham, G., et al., "The Cornerstones of SOA Governance: Policies, Registries and Repositories", Oct. 2006, pp. 1-32, IBM SOA Governance White Paper.
Management of the service oriented-architecture life cycle, Cox et al., IBM Systems Journal, vol. 44, No. 4, 2005 (18 pages).
Berbner et al., "An approach for the Management of Service-oriented Architecture (SoA) based Application Systems", Enterprise Modelling and Information Systems Architectures (EMISA 2005) Oct. 24-25, 2005 (14 pages).
Bajaj, S.B., et al., "Web Services Policy 1.2—Framework (WS-Policy)", W3C Member Submission, http://www.w3.org/Submission/WS-Policy, Apr. 2006, pp. 1-22.
Ballinger, K., et al., "Basic Profile Version 1.0" Final Material, Dated: Apr. 16, 2004, 19:06:16, WSI, http://www.ws-i.org/ProfilesIBasicProfile-I.0-2004-4-16.htm, pp. 1-42.
Vedaumthu, A.S., et al., Understanding Web Services Policy, 2008 Microsoft Corporation, http://mdsn.microsoft.com/en-us/library/ms996497(printer).aspx, Jul. 2006, pp. 1-28.

* cited by examiner

*Primary Examiner* — Li B Zhen
*Assistant Examiner* — Lenin Paulino (57) ABSTRACT

A method and appertaining system provide that an integrated Service Oriented Architecture (SOA) repository stores functional and non-functional requirements and associated data and results of associated with software services across the software lifecycle, thereby permitting access at a common point or in a common way by a user to all relevant information about the software service at least during the development, testing, and run-time stages of the software service. Thus, all design documents, testing requirements and results, and run-time policies and contracts can be provided in a common location to facilitate development in the service oriented architecture.

22 Claims, 4 Drawing Sheets

INTEGRATED SOA DEPLOYMENT AND MANAGEMENT SYSTEM AND METHOD FOR SOFTWARE SERVICES

CROSS-REFERENCE TO RELATED APPLICATIONS

The subject matter of the present invention is related to U.S. patent application Ser. No. 12/249,423, now U.S. Publication No. 20100095266, filed Oct. 10, 2008, and entitled, "A System and Method for a Policy-Based Management of a Software Service Component in an SOA architecture Throughout the Lifecycle Process", the contents of which are herein incorporated by reference.

BACKGROUND

Business applications created using the principles of Service Oriented Architecture ("SOA") can reuse multiple web services. Unlike many regular applications, where the entire application is designed and developed by one team (and hence can benefit from good communications and tight control over the development process), the web services that make up a business application will typically be developed by different teams and at different times. Furthermore, unlike regular applications, web services are reused by multiple applications at different times.

Historically, management of web services has been disjointed between the development-testing stages of the service, and the production run-time stage of the service. What is needed is an approach that integrates management of the web service across the lifecycle during the development, testing and production run-time stages.

Web Services & Web Services-Policies

Web services are being successfully used for interoperable solutions across various industries. One of the key reasons for interest and investment in web services is that they are well-suited to enable service-oriented systems. XML-based technologies, such as SOAP (a protocol for exchanging XML-based messages over computer networks, normally using HTTP/HTTPS), XML Schema and WSDL (Web Services Description Language, an XML-based language that provides a model for describing web services) provide a broadly-adopted foundation on which to build interoperable web services.

The WS-Policy and WS-Policy Attachment specifications, the relevant standards of W3C currently defined on the filing date of this application being herein incorporated by reference, extend this foundation and offer mechanisms to represent the capabilities and requirements of web services as Policies.

Functional & Non-Functional Requirements for Web Services

Web services have both functional requirements and non-functional requirements. Functional requirements are associated with specific functions, tasks or behaviors the system must support, while non-functional requirements are constraints on various attributes of these functions or tasks.

The functional requirements are software requirements that define behavior of the system, that is, the fundamental process or transformation that software and hardware components of the system perform on inputs to produce outputs. They define a function that a system or component must be capable of performing. For example, in a credit card transaction handling service, a functional requirement might be that the web service interacts with a business inventory database to retrieve a price of a requested good or service.

The non-functional requirements describes not what the software will do, but how the software will do it, for example, software performance requirements, software external interface requirements, software design constraints, and software quality attributes. For example the credit card transaction may be required to complete within two minutes of its initiation.

Service Metadata

Service metadata relates to data associated with the service across the service lifecycle. With regard to the production run-time of services, it is an expression of the visible aspects of a web service during the production run-time stage of a web service, and consists of a mixture of machine- and human-readable languages. Machine-readable languages enable tooling. For example, tools that consume service metadata can automatically generate client code to call the service. Service metadata can describe different parts of a web service and thus enable different levels of tooling support.

First, service metadata can describe the format of the payloads that a web service sends and receives. Tools can use this metadata to automatically generate and validate data sent to and from a web service. The XML Schema language is frequently used to describe the message interchange format within the SOAP message construct, i.e., to represent SOAP Body and SOAP Header blocks.

Second, service metadata can describe the "how" and "where" a web service exchanges messages, i.e., how to represent the concrete message format, what headers are used, the transmission protocol, the message exchange pattern and the list of available endpoints. The Web Services Description Language is currently the most common language for describing the "how" and "where" a web service exchanges messages. WSDL has extensibility points that can be used to expand on the metadata for a web service.

Third, service metadata can describe the capabilities and requirements of a web service, i.e., representing whether and how a message must be secured, whether and how a message must be delivered reliably, whether a message must flow, a transaction, etc. Exposing this class of metadata about the capabilities and requirements of a web service enables tools to generate code modules for engaging these behaviors. Tools can use this metadata to check the compatibility of requesters and providers—this may be done according to the Web Services Interoperability (WS-I) standard, whose goal is to provide seamless and automatic connections from one software application to another. SOAP, WSDL, and UDDI protocols define a self-describing way to discover and call a method in a software application—regardless of location or platform. Data is marshaled into XML request and response documents and moved between software packages using HTTP or message-based protocols.

A Web Services Policy can be used to represent the capabilities and requirements of a web service.

WS-Policy

A Web Services Policy (WS-Policy) is a machine-readable language (an XML-structured document) for representing the capabilities and requirements of a web service. These are called "policies", and may be comprised of a number of artifacts that represent the capabilities and requirements.

The lowest level artifact considered in the WS-Policy specification is an assertion. There are different ways one can define an assertion, but all defined assertions should be bound with certain types of tags. A combination of all assertions form a policy (which is simply a collection of assertions)—it does not imply order. An engine can read these assertions, and evaluate the policy as being true or false.

The WS-Policy standard offers mechanisms to represent consistent combinations of capabilities and requirements, to determine the compatibility of policies, to name and reference policies and to associate policies with web service metadata constructs such as service, endpoint and operation. See Asir S. Vedamuthu (Editor), Daniel Roth, MSDN Web Services Technical Articles: Understanding Web Services Policy (2008) (herein incorporated by reference).

UDDI (Run-Time)

Different Web Services Management vendors have proposed various solutions in an attempt to ensure web services meet all production run-time requirements. Some of these solutions make extensive use of a Universal Description, Discovery and Integration (UDDI) Registry to accomplish use cases around runtime policies. UDDI is a platform-independent registry for businesses worldwide to list their services on the Internet.

UDDI is an open industry initiative, sponsored by the Organization for the Advancement of Structured Information Standards (OASIS) (a global consortium that drives the development, convergence and adoption of e-business and web service standards), enabling businesses to publish service listings and discover each other and define how the services or software applications interact over the Internet.

A primary limitation, however, is that UDDI is limited in the types of artifacts it uses, i.e., policies for enforcement at runtime, and thus does not capture all of the functional and non-functional requirements associated with development and testing stages for an SOA deployment in an integrated SOA repository.

Furthermore, it does not take into account usage patterns and interoperable policies, nor does it try to tie the concepts in across the whole lifecycle of a web service (i.e., from design through development, testing, production, and finally, to sunset). Other proposed solutions rely on a UDDI registry instead of an SOA repository.

An SOA repository can contain services, service metadata, and several different artifacts that include not only policies, but, for example, artifacts like usage plans, documentations, and standards compliance rules. Using a UDDI registry solves a part of the problem because it captures the location of artifacts like service definitions and runtime policy definitions. It does not, however, have the capability to store all of the relevant metadata or the actual policies or be involved in the enforcement of any particular lifecycle stage or state using quality assurance or other tools.

BRIEF DESCRIPTION OF THE DRAWINGS

The invention is described below with reference to various embodiments illustrated in the drawings described below.

DETAILED DESCRIPTION OF THE EMBODIMENTS

According to various embodiments of the invention, a method is provided for managing and enforcing business requirements of a software service in a service oriented architecture (SOA) across a plurality of service lifecycle stages, the method comprising: in a development stage: defining functional and non-functional requirements for the service; storing the functional and non-functional requirements in an integrated SOA repository that is a database implemented on a computer system; and storing outputs or results of design stage requirements of the service in the integrated SOA repository; in a testing stage: accessing the functional requirements; preparing testing functional requirements and tests from the functional requirements; performing tests on the service related to the functional requirements to produce test results; and storing the test results in the integrated SOA repository; in a production run-time stage: preparing run-time policies from the non-functional requirements; deploying the run-time policies to a policy enforcement point; performing a policy enforcement operation utilizing at least one deployed non-functional policy; and storing a result of the policy enforcement operation in the integrated SOA repository.

A system is also provided for managing and enforcing business requirements of a software service in a service oriented architecture (SOA) across a plurality of service lifecycle stages, the system comprising: an integrated SOA repository stored in memory locations of a computer system, the integrated SOA repository comprising: one or more functional and non-functional requirements for the software service created during a design stage of the software service; test results related to tests run during a testing stage of the software service; and policy enforcement data and results related to the software service during a production run-time of the software service; the system further comprising: a testing mechanism that receives at least one formal requirement from the integrated SOA repository, performs relevant tests, and provides one or more test results back to the integrated SOA repository; and a policy enforcement point comprising deployed run-time policies that have been prepared from the non-functional requirements stored in the integrated SOA repository, the policy enforcement point producing results or data of policy enforcement operations and stores the results or data in the integrated SOA repository.

Figure 1:
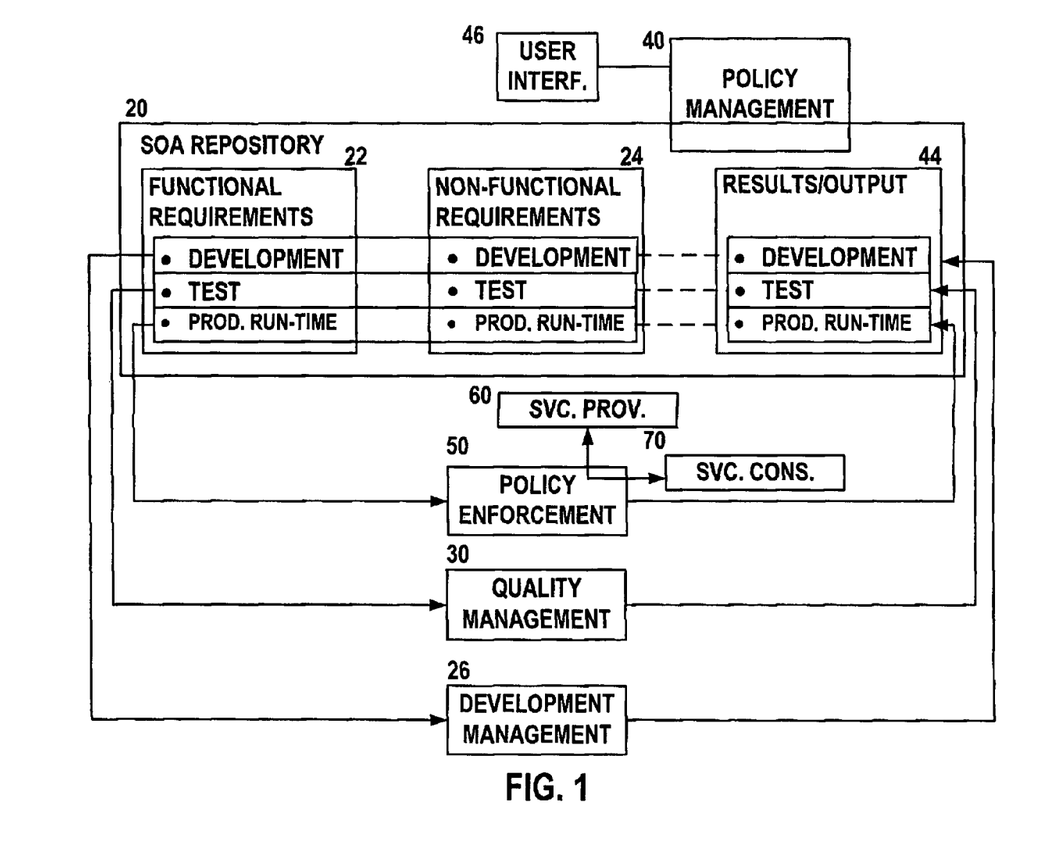
FIG. 1 is a block diagram illustrating the integrated SOA repository in which functional and non-functional requirements are provided along with results and outputs associated with various service component lifecycle stages.

FIG. 1 is a block diagram illustrating a simplified implementation of an embodiment of the inventive system, which provides for capturing, in an integrated manner, functional and non-functional requirements (collectively, a desired state model) for a business application using an SOA and providing results and state information in a commonly accessible place in an integrated SOA repository across the lifecycle of the service, including at least, but not limited to, development, testing, and production run-time stages. By providing this information in an integrated SOA repository, a user can be aware of and have the tools to access all necessary information related to the present and past design and operation of a software service.

As can be seen in FIG. 1, an integrated SOA repository 20 comprises both the functional 22 and non-functional 24 requirements for a given web service. The results or output 44 related to the requirements 22, 24, are also located in the SOA repository 20. For both the requirements 22, 24, and results or outputs 44, a delineation is made for at least the development, test, and production run-time stages of the web service.

The requirements 22, 24 are managed or enforced by different elements, depending upon which stage of the software lifecycle the web service is currently at.

Services that are currently in development may have their requirements enforced by development management 26. By way of example, a development requirement may be that flowcharts for software modules are created in Microsoft Visio® and stored on a server DEVSRV1. The development management 26 could ensure that the flowcharts conform to these requirements, and the results/output 44 for this particular development stage could be the flowcharts themselves and/or an indication that the requirement has been met.

Services that are currently in testing may have their requirements enforced by quality management 30. Quality management 30 may generate testing functional requirements 33 as well as the necessary tests that are used to test the web service.

For example, a requirement for a credit card web service may be to accept a user name, user payment information, merchant ID, merchant product code, and price, and to contact a merchant server, execute the transaction, and record the results of the transaction. Quality management 30 may then define testing functional requirements 32 and then conforming tests that exercise the service according to various scenarios.

The results of the test 34, e.g., in the form of status reports, etc., can then be provided to the integrated SOA repository 34 so that they may be accessed by others. It should be noted that, preferably, the integrated SOA repository 20 would not hold the outputs from perhaps the hundreds of individual tests that would be run, but rather would be used to contain summary information about the tests as test results 34 in an aggregated, compiled, or filtered form.

Services that have entered production run-time may have their requirements enforced at policy enforcement points 50. It is at this point that service providers 60 can be ensured that service consumers 70 are using the services in accordance with the run-time policies. In the credit card example, the production run-time policy could be that all credit card information be sent encrypted according to a particular encryption standard.

This desired state model is, in essence, a complete collection of artifacts stored and accessible (to developers, testers, and end-users) in the integrated SOA repository 20 that govern the entire lifecycle of the business application and the services that make up the business application. The artifacts stored in the integrated SOA repository 20 thus may be used to ensure compliance of the business application and associated web service components throughout development, testing, and deployment. In other words, to ensure that the web services meet all requirements, both functional 22 and non-functional 24, it is necessary to capture both the functional 22 and non-functional 24 requirements of the web service in a common place (the integrated SOA repository 20) and ensure that they can be consistently and at least partially automatically enforced throughout the software lifecycle, including during development, testing, and production run-time.

Historically, not doing this has resulted in inconsistent rules around non-functional requirements like, for example, security enforcement, service version management, compliance with WS-I profiles, and usage patterns. This has led to problems in reaping the benefits of an SOA investment because it has been difficult to consistently and reliably reuse web services as they go through the software development lifecycle into production and finally into sunset (retirement of the service or service version).

Thus, the elements may include: 1) artifacts for rules, policies, 22, 24 and results 44 are stored in a universally accessible SOA repository 20 in an integrated manner (meaning that the mechanisms for access are similar in nature, and possibly including a common user interface 46); 2) the polices and rules 22, 24 cover at least the development, testing, and production run-time stages for the web services components and the business applications that they make up; 3) enforcement 50 of the policies and rules 22, 24 ensure integrity of the system; and 4) advancement to the next development stage (development, test, production run-time) is based on adherence to the rules and policies 22, 24 stored as artifacts in the integrated SOA repository 20.

The artifacts that are stored in the integrated SOA repository 20 that help ensure compliance may be very broadly defined. They can include policies that are enforced during development time, such as for Web Services Interoperability (WS-I) compliance. WS-I is an organization designed to promote web service interoperability across platforms, operating systems, and programming languages. The WS-I Basic Profile 1.0 (herein incorporated by reference) is an outline of requirements to which WSDL and web service protocol (SOAP/HTTP) traffic must comply in order to claim WS-I conformance/compliance.

The artifacts can further include schema guidelines for WSDL. The artifacts can include policies for enforcement during run time (e.g., policies for enforcing corporate security rules, quality of service, contracts, etc.). They can include usage plans, documentation, standards compliance rules, etc., and may be stored as WS Policy Documents in the integrated SOA repository 20. It should be noted that certain requirements, such as security requirements, can be provided both as functional requirements and as non-functional requirements. In such a case, two security policies would be provided, one related to the functional requirements, and the other related to the non-functional requirements.

Another way to construe these artifacts is that they are a comprehensive collection of artifacts serving as the glue that ensure the various web services that make up a business application do so in a robust manner all the way through the development, testing, and production stages. Thus, the desired state includes all of the functions and rules—not just the core functionality of the business application and respective services, but how they are being used. In this way, the system provides a very explicit manner of capturing the requirements at all stages in the lifecycle of a service in order to ensure integrity, and not just run-time requirements.

It should be noted that the integrated SOA repository 20 in general will not be the entity that stores the source code or executable code (respective development, test, and production servers would ideally store this), although nothing in the design explicitly precludes such a configuration. And, as previously noted, individual test artifacts (which could, e.g., run in the hundreds for a given test series), would generally not reside in the integrated SOA repository 20. But the results of the tests, e.g., an overall report summary (such as might be needed to advance a service from a test status to a production status) 44, would be stored as an artifact (e.g., as a text document) in the integrated SOA repository 20, where it could be viewed and verified by prospective users of the service component.

The policy management component 40 is shown in FIG. 1 as a block that overlaps the SOA repository 20 and does not overlay the development management 26, quality management 30, and policy enforcement 50. However, it should be noted that the policy management 40 and the development management 26, quality management 30, and policy enforcement 50 are tightly integrated with, and accessible to, the policy manager 40.

Figure 2:
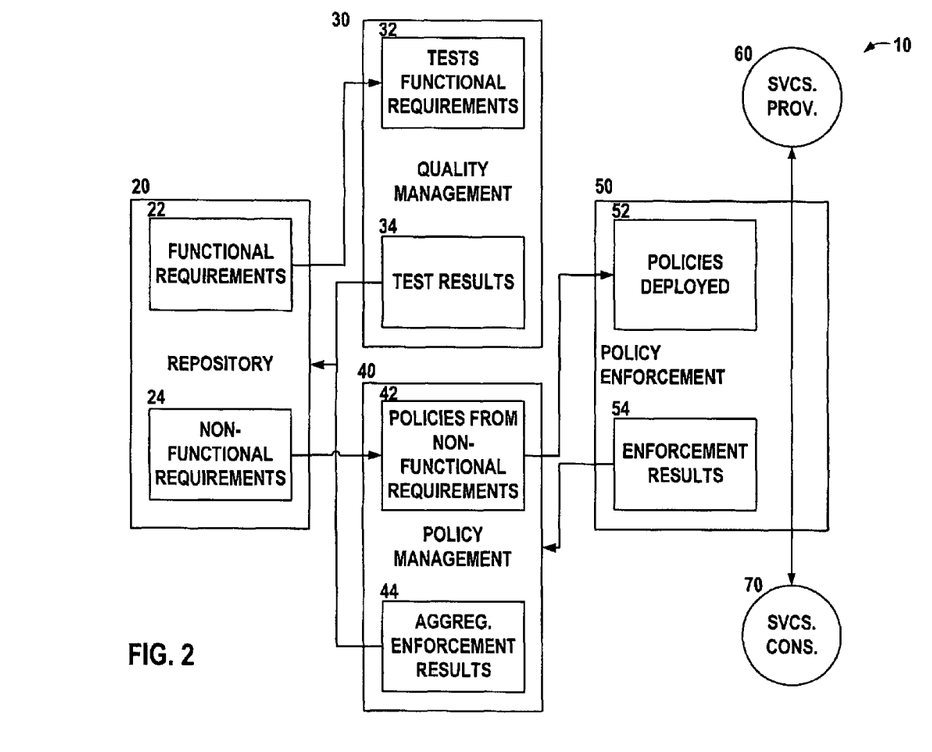
FIG. 2 is a block diagram illustrating the handling of both functional and non-functional requirements in the system.

FIG. 2 is a block diagram providing a slightly different focus and breakdown of the system organization. As can be seen, the integrated SOA repository 20 comprises the segregated functional 22 and non-functional 24 requirements. The functional requirements 22 are passed off to quality management 30 (such as a quality assurance group) to create test functional requirements 32 and subsequent tests (not shown)

that are used to test the functional requirements of the service. The test results 34, which may be aggregations of individual test outputs, are then provided back to the integrated SOA repository 20.

The non-functional requirements 24 are provided to the policy manager 40, where policies from the non-functional requirements 42 are determined. From these, the policies may be deployed 52 at policy enforcement points 50 in order to ensure that production run-time policies are complied with by service consumers 70. For example, in a credit card processing service, a web services consumer 70 may have established a contract with a services provider 60 to engage in no more than 5000 transactions per second. This contract would result in the creation of a policy and this policy may be provided at the policy enforcement point 50.

Enforcement results 54 can be produced, and these are then aggregated back 44, ultimately to the integrated SOA repository 20. For example, if a services consumer 70 were exceeding the contract and engaging in 6000 transactions per second, this information can be logged, or if a mechanism restricting an attempted 6000 transactions per second to an actual 5000 transactions per second were engaged, then this information too could be included in the enforcement results 54.

Thus, in an embodiment, the integrated SOA repository 20 may provide a software governance infrastructure storing artifacts like software service definitions, policies and business requirements in contracts. The software services examples include inventory tracking software, credit-card payment software, and product delivery tracking software.

The reason for the breakdown between functional and non-functional requirements in this manner is because there are certain aspects that can be checked statically (off-line), whereas there are others that can only be determined dynamically (on-line)—one cannot run a test on a system and say whether someone in real-time is using the system in a non-secure manner.

Figure 3:
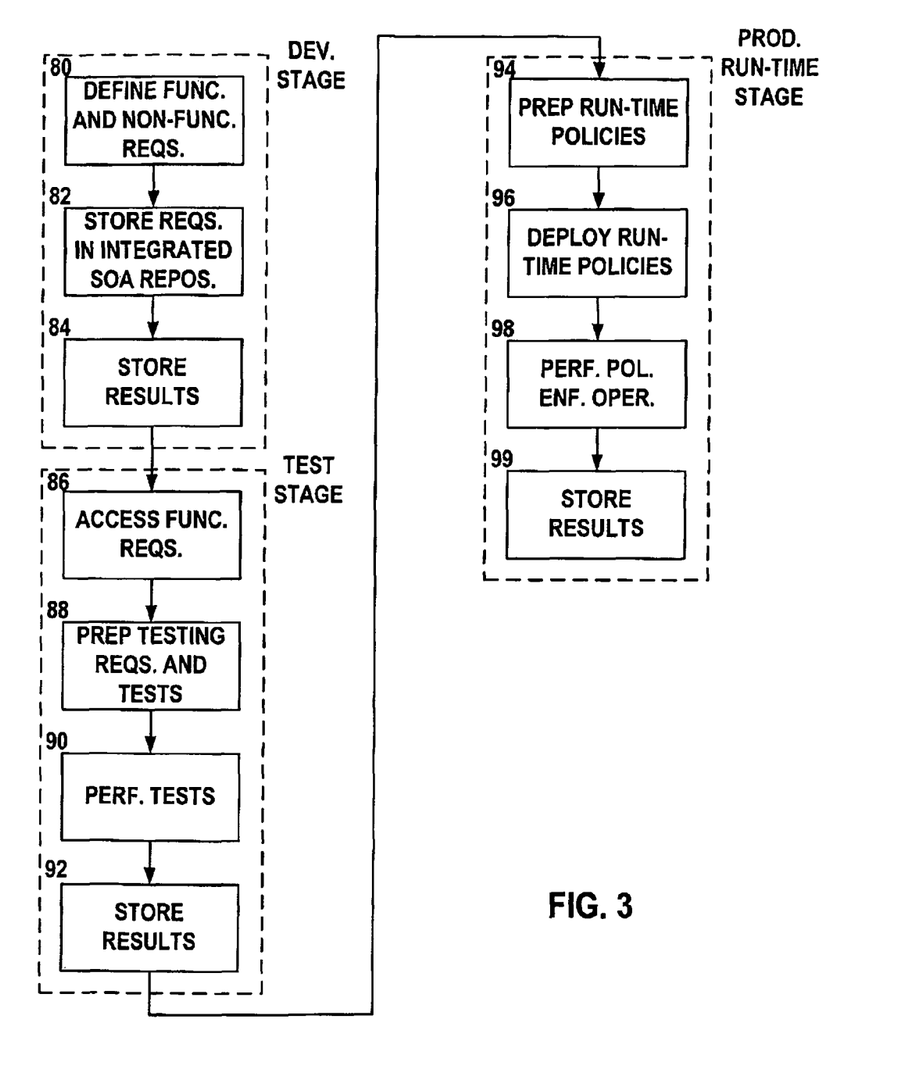
FIG. 3 is a flow chart showing method for providing lifecycle governance to an information technology system constructed using service oriented architecture.

FIG. 3 illustrates a method for implementing the governance system, where the description generally parallels that of the system above. In FIG. 3, in a development stage, the functional and non-functional requirements are defined 80 and stored 82 in an integrated SOA repository. The results or output of the development stage, such as the existence of certain design documentation in a particular format at a particular location are stored 84 in the integrated SOA repository.

Subsequently, in a testing stage, the functional requirements are accessed 86 and relevant test requirements and tests are created 88. The tests on the service are performed 90, and results possibly summarized or aggregated, and these results are then stored 92 in the integrated SOA repository.

At a production run-time stage, the run-time policies 94 are prepared and then deployed 96 at respective policy execution points. A policy enforcement operation 98 is performed, and the results of this operation are stored 99 in the integrated SOA repository.

Although FIG. 3 illustrates the process steps as being performed in a sequential manner, not all of the steps need to be performed strictly in sequence, and some can overlap in time. For example, preparation of the run-time policies 94 would not necessarily have to be performed after the end of the test stage, but could be performed in parallel with the test or even development stage.

In this way, information is captured in policies for enforcement during design time (e.g., WS-I Compliance, see Web Services Interoperability Organization, policies for enforcement during testing (test requirements and related documents), policies for enforcement during runtime (e.g., polices for enforcing corporate security rules, Quality of Service, etc.), usage plans (in the form of contracts), and the like, in an integrated manner that can be commonly and easily accessed by a user.

Software Lifecycle

Figure 4:
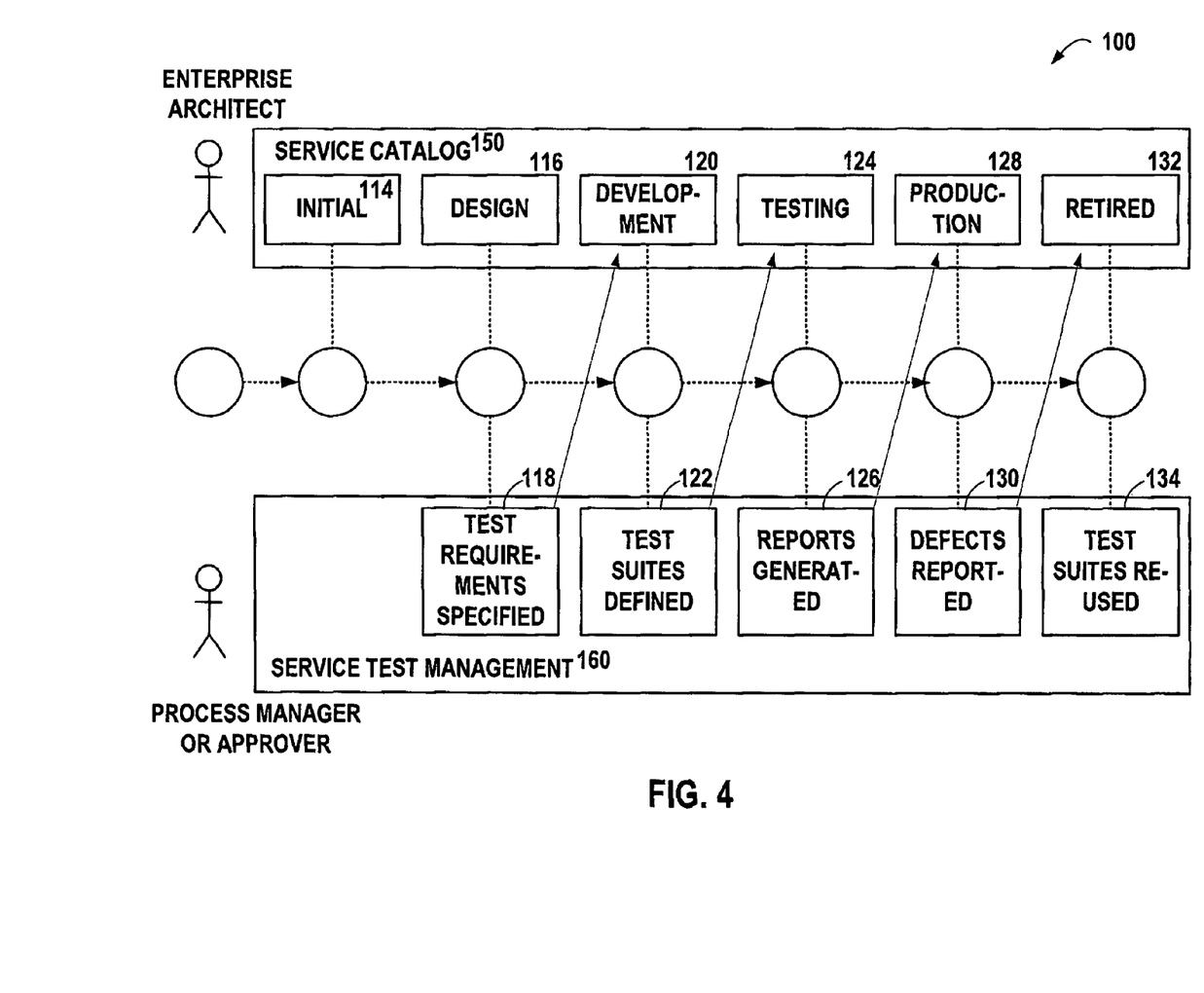
FIG. 4 is a block flow diagram illustrating movement of a service component through various life cycle stages.

FIG. 4 illustrates a mechanism via which a web service may be advanced throughout its lifecycle. This mechanism is explained in greater detail in U.S. patent application Ser. No. 12/249,423, noted above.

The various embodiments of the invention have thus far been discussed in terms of three primary lifecycle stages of the service: development, (which may include any or all activities related to development from conception to completion of coding), testing, and production run-time (which may also include sunset or retirement of the service). However it is possible to incorporate a more robust and staged description of the service lifecycle, and FIG. 4 illustrates the progression of a service from one lifecycle stage to the next.

As shown in FIG. 4, the component developer or enterprise architect obtains an initial specification 114 for a service component, and performs an initial design 116 of the service component. Prior to actually developing the component, i.e., writing the code that implements the functionality from the design stage, various test requirements are specified 118. Although the testing aspects were discussed above as subsequent to the development states, it is also possible, as is illustrated in FIG. 4, that at least the testing requirements 118 are specified prior to the development work 120.

When the enterprise architect wishes to promote the software component (service) from the design stage 116 to the development stage 120 so that component development can begin, she submits a promotion request to the process manager who determines if the test requirements have been specified 118, i.e., if the stage promotion criteria have been met. If not, the service component remains in the design state 116 while the enterprise architect addresses the defects identified by the process manager. If the process manager determines that the test requirements have been specified 118, the service component is promoted to the development stage 120, where the development of the service component may begin.

Following through on this example, once the service component has been developed, and when the operator believes that the artifacts captured in the integrated SOA repository are ready for testing, the enterprise architect submits a promotion request to the process manager to promote the service component to the testing stage 124. This can be achieved by marking a database entry associated with the service in the integrated SOA repository with an indication to promote the service. It could alternately be achieved by sending a communications message, such as an e-mail or other form of message to the process manager (any of the marking for promotion for any of the stages could be achieved in various ways, as described herein).

The process manager checks the requirement for this stage—here, looking to see if the appropriate test suites (artifacts) have been defined 122. If not, the software component remains at the development stage 120 until the defects are corrected, otherwise, it is promoted to the testing stage 124, which signals that the appropriate tests for the service are ready to be run.

Once the service component has been fully tested, the enterprise architect submits a promotion request to the process manager to promote the service component to the production stage 128. The process manager checks the requirement for this stage—here, looking to see if the appropriate reports or test results have been defined or produced 126. If not, the software component remains at the test stage 124 until the defects are corrected, otherwise, it is promoted to the production run-time stage 128. This corresponds with the notion of a software release, i.e., the component is released into production 128.

During production 128, the various run-time policies (discussed above), contracts, etc., based on, e.g., non-functional requirements, are implemented at policy enforcement points, and metrics related to the policy enforcement are stored within the integrated SOA repository.

As the web services are used, the appropriate performance and policy enforcement metrics are updated in the integrated SOA repository. These performance and policy enforcement metrics give the operator a better idea about the services that need to be reused as quality assurance as well as runtime performance and enforcement data is available.

In an embodiment, the system supports heterogeneous policy enforcement points such as hardware based XML firewalls and enterprise service buses. This is accomplished by an engine that accepts WS-Policy documents as inputs and, based on the policy enforcement point type, and converts the assertions into native rules that can be understood by the policy enforcement point.

Examples of performance metrics include availability, message throughput, latency, response time and number of faults. Examples of enforcement metrics include executing of routing, audit compliance, and specific business events. In the policy manager, the lifecycle state changes can be represented by appropriate indicators on a display of the user interface device for ease of reference.

The SOA management solution (in this case, the SOA policy enforcer) can pull in the current state and related information for the service component along with enforcement rules and deploy these artifacts to policy enforcement points like XML Firewalls, Enterprise Service Bus, etc.

The lifecycle change states can be configured in the policy manager when defining the lifecycle process such that the model exchange happens on the right trigger points. As a general rule, the lifecycle transitions are initiated manually, but as a part of the transition process, the SOA repository contents can be "pushed" into an appertaining UDDI registry. When the UDDI registry is updated, version 3 of the UDDI specification identifies a mechanism for notification of such an update. The SOA policy enforcer can recognize these notifications, and, in response, begin policy provisioning and policy deployment to the policy enforcement point.

Another protocol that could be used for this purpose is the Atom Publishing Protocol (APP), which is an HTTP-based protocol that is used for creating and updating web resources. In this embodiment, web feeds can be generated when lifecycle transitions happen and the SOA Policy enforcer can interpret the web feeds as indicating a transition and thus begin the provisioning process.

Once the model is exchanged, the conversion of the technical policies which may be defined using, e.g., WS-Policy and WS-Security Policy can occur automatically (for requirements that can be easily checked by a computer, e.g., the presence of a document on a server) or at least semi-automatically (where some manual intervention is required, e.g., to review the contents of a document) at the policy manager (SOA policy enforcer). The policy enforcement point is configured with the rules as defined in the policies.

Once the service component has served its productive life, the enterprise architect submits a promotion request to the process manager to promote the service component to the retirement stage 132. The process manager checks the requirement for this stage—here, looking to see if the appropriate defects have been reported 130. If so, the service component is promoted to the retirement stage 132. A further requirement may be provided for the provision that the test suites be reused 134. As illustrated in FIG. 4, a service catalog 150 is provided to define the lifecycle stages, and similarly service test management 160 is provided to define the various requirements needed at each of the life cycle stages.

Advantageously, and according to various embodiments of the invention discussed above, by utilizing an integrated SOA repository, a consumer of web services is provided with an additional trust that the services they want to reuse have gone through appropriate design and testing quality assurance procedures. In addition, the overall design intent of the services can be measured and tracked at any point in the service lifecycle.

The use of the terms "a" and "an" and "the" and similar referents in the context of describing the claimed apparatus, device, system or method (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed apparatus, device, system or method and does not impose a scope limitation unless otherwise claimed. No language in the specification should be construed as indicating any non-claimed element as essential to the practice of the claimed apparatus, device, system or method.

The system or systems may be implemented on any general purpose computer or computers comprising algorithms for performing the functions as described above, and the components may be implemented as dedicated applications or in client-server architectures, including a web-based architecture. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions executable on the processor on media such as tape, CD-ROM, etc., where this media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

What is claimed is:

1. A method for managing and enforcing business requirements of a software service in a service oriented architecture (SOA) across a plurality of service lifecycle stages, the method comprising:
   in a development stage:
      defining functional and non-functional requirements for the service;
      storing the functional and non-functional requirements in an integrated SOA repository that is a database implemented on a computer system;
   in a testing stage:
      accessing the functional requirements;
      preparing testing functional requirements and tests from the functional requirements;
      performing the tests on the service related to the functional requirements to produce test results; and
      storing the test results in the integrated SOA repository;
   in a production run-time stage, a computer:
      preparing run-time policies from the non-functional requirements;
      deploying the run-time policies to a policy enforcement point;
      performing a policy enforcement operation utilizing at least one of the run-time policies; and
      storing a result of the policy enforcement operation in the integrated SOA repository.

2. The method according to claim 1, wherein the producing of test results includes producing results of a plurality of individual tests and then aggregating the results of the individual tests into an aggregate test result that is subsequently stored in the integrated SOA repository.

3. The method according to claim 1, wherein the run-time policies are stored as Web Services Policy documents.

4. The method according to claim 1, further comprising providing usage plans, documentation, and standards compliance rules as a part of the run-time policies.

5. The method according to claim 1, further comprising interfacing a service consumer to a service provider through the policy enforcement point.

6. The method according to claim 1, further comprising:
   promoting the software service from an earlier lifecycle stage to a later lifecycle stage if promotion requirements stored in the integrated SOA repository are met.

7. The method according to claim 6, further comprising:
   indicating the promotion of the software service by marking an entry in the integrated SOA repository when the promotion requirements are met.

8. The method according to claim 1, further comprising:
   accessing the functional and non-functional requirements, the run-time policies, the test results, and the result of the policy enforcement operation in the integrated SOA repository through a common user interface.

9. A system for managing and enforcing business requirements of a software service in a service oriented architecture (SOA) across a plurality of service lifecycle stages including a design stage, a testing stage, and a production run-time stage, the system comprising:
   a non-transitory storage medium to store an integrated SOA repository, the integrated SOA repository comprising:
      one or more functional and non-functional requirements for the software service created during the design stage of the software service;
      test results related to tests run during the testing stage of the software service; and
      policy enforcement data related to the software service during the production run-time stage of the software service;
   a testing mechanism to, during the testing stage, prepare testing requirements and the tests from the functional requirements in the integrated SOA repository, perform the tests, and provide one or more test results back to the integrated SOA repository; and
   a policy enforcement point comprising deployed run-time policies that have been prepared from the non-functional requirements stored in the integrated SOA repository, the policy enforcement point to, during the production run-time stage, produce the policy enforcement data of a policy enforcement operation and store the policy enforcement data in the integrated SOA repository.

10. The system according to claim 9, wherein the functional requirements are defined according to Web Services Interoperability (WS-I) Basic Profile requirements.

11. The system according to claim 9, wherein the functional requirements are provided in a Web Services Description Language (WSDL) or as an XML schema.

12. The system according to claim 9, wherein the one or more test results comprise aggregated or summarized results from a plurality of individual tests.

13. The system according to claim 9, wherein the run-time policies comprise usage plans, documentation, and standards compliance rules.

14. The system according to claim 9, wherein the policy enforcement point includes an interface for interfacing a service consumer to a service provider.

15. The system according to claim 9, further comprising:
   a promotion mechanism for promoting the software service from an earlier lifecycle stage to a later lifecycle stage if promotion requirements stored in the integrated SOA repository are met.

16. The system according to claim 15, further comprising:

a data record in the integrated SOA repository associated with the software service and comprising a software lifecycle promotion status entry and associated promotion requirements.

17. A method for managing a software service, the method comprising:

storing a design output created during a design stage of a service lifecycle for the software service in an integrated service oriented architecture (SOA) repository in a computer system, the SOA repository further storing functional requirements and non-functional requirements for the software service;

storing a test output created during a testing stage of the service lifecycle in the integrated SOA repository, the testing stage preparing testing requirements and tests from the functional requirements and performing the tests on the software service to produce the test output;

storing a run-time output created during a run-time stage of the service lifecycle in the integrated SOA repository, the run-time stage preparing run-time policies from the non-functional requirements, and performing, by a policy enforcement point during the run-time stage, a policy enforcement operation utilizing at least one of the run-time policies to produce the run-time output; and providing access to the design output, test output, and run-time output in the integrated SOA repository to a user involved in any stage of the service lifecycle.

18. The method according to claim 1, wherein the functional requirements define a process that is performed by the service, and the non-functional requirements include a constraint on the service.

19. The method according to claim 1, further comprising:

in the development stage, creating a flowchart for the service, the flowchart conforming to the functional and non-functional requirements; and storing the flowchart in the integrated SOA repository.

20. The system according to claim 9, wherein the functional requirements define a process that is performed by the software service, and the non-functional requirements include a constraint on the software service.

21. The method according to claim 17, wherein the functional requirements define a process that is performed by the software service, and the non-functional requirements include a constraint on the software service.

22. The system according to claim 9, further comprising:

a development management mechanism to, during the design stage:

create a flowchart for the software service, the flowchart conforming to the functional and non-functional requirements; and store the flowchart in the integrated SOA repository.

\* \* \* \* \*